(12) United States Patent
Wadia et al.

(10) Patent No.: US 7,827,803 B1
(45) Date of Patent: Nov. 9, 2010

(54) METHOD AND APPARATUS FOR AN AERODYNAMIC STABILITY MANAGEMENT SYSTEM

(75) Inventors: Aspi Rustom Wadia, Loveland, OH (US); David K. Christensen, Newbury, MA (US); Andrew Breeze-Stringfellow, Montgomery, OH (US); Kiyoung Chung, West Chester, OH (US); Matthew William Wiseman, Fairfield, OH (US); Peter Nicholas Szucs, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1078 days.

(21) Appl. No.: 11/528,015

(22) Filed: Sep. 27, 2006

(51) Int. Cl.
 *F02C 9/20* (2006.01)
 *F02C 9/50* (2006.01)

(52) U.S. Cl. .................. 60/772; 60/39.27; 60/794; 415/17; 700/100

(58) Field of Classification Search ............... 60/39.27, 60/39.23, 794, 772; 415/26, 17; 700/100
See application file for complete search history.

(56) References Cited

U.S. PATENT DOCUMENTS

| 3,852,958 | A | | 12/1974 | Adams et al. |
| 4,083,235 | A | | 4/1978 | Gallant |
| 4,117,668 | A | | 10/1978 | Elsaesser et al. |
| 4,216,672 | A | | 8/1980 | Henry et al. |
| 4,335,600 | A | * | 6/1982 | Wu et al. .................. 73/112.03 |
| 4,608,860 | A | | 9/1986 | Charrier et al. |
| 4,922,757 | A | * | 5/1990 | Rozelle et al. .................. 73/660 |
| 5,594,665 | A | | 1/1997 | Walter et al. |
| 5,683,223 | A | * | 11/1997 | Harada et al. .................. 415/17 |
| 5,915,917 | A | | 6/1999 | Eveker et al. |
| 6,098,010 | A | | 8/2000 | Krener et al. |
| 6,155,038 | A | * | 12/2000 | Irwin et al. .................. 60/782 |
| 6,164,902 | A | | 12/2000 | Irwin et al. |
| 6,231,306 | B1 | | 5/2001 | Khalid |
| 6,438,484 | B1 | | 8/2002 | Andrew et al. |
| 6,513,333 | B2 | * | 2/2003 | Sugitani .................. 60/39.27 |

(Continued)

FOREIGN PATENT DOCUMENTS

EP          1 008 757 A3     4/2001

(Continued)

OTHER PUBLICATIONS

EP Search Report, Application No. 07 11 6217 (Feb. 18, 2008).

*Primary Examiner*—Ted Kim
(74) *Attorney, Agent, or Firm*—William Scott Andes, Esq.; Armstrong Teasdale LLP

(57) ABSTRACT

A method for using an aerodynamic stability management system is disclosed. The method includes placing at least one pressure sensor in a compressor, the at least one pressure sensor communicating with an aerodynamic stability management system controller and monitoring gas turbine engine performance using the aerodynamic stability management system controller. The controller includes a memory, an input/output interface and a processor. The method also includes defining a correlation threshold value and calculating a correlation measure using a plurality of pressure signals generated by the at least one pressure sensor and comparing the correlation measure with the correlation threshold value. When the correlation measure is less than the correlation threshold value a corrective action is implemented.

20 Claims, 6 Drawing Sheets

U.S. PATENT DOCUMENTS

| | | |
|---|---|---|
| 6,532,433 B2 | 3/2003 | Bharadwaj et al. |
| 6,582,183 B2 * | 6/2003 | Eveker et al. ................... 415/1 |
| 6,618,693 B2 * | 9/2003 | Andrew et al. .............. 702/188 |
| 6,715,984 B2 | 4/2004 | Nakajima et al. |
| 7,108,477 B2 | 9/2006 | Grauer |
| 7,326,027 B1 * | 2/2008 | Skoch et al. ................... 415/17 |
| 7,376,504 B2 * | 5/2008 | Zagranski ................... 701/100 |
| 2002/0177979 A1 * | 11/2002 | Andrew et al. .............. 702/188 |

FOREIGN PATENT DOCUMENTS

| | | |
|---|---|---|
| EP | 1 256 726 B1 | 4/2005 |
| WO | 9403862 A1 | 2/1994 |
| WO | 03038282 A1 | 5/2003 |

* cited by examiner

| | |
|---|---|
| CORRELATION THRESHOLD | 140 |
| 1st REVOLUTION HIGH PASSED PRESSURE READINGS | 150 |
| 2nd REVOLUTION HIGH PASSED PRESSURE READINGS | 160 |
| CALCULATED CORRELATION MEASURE | 170 |
| CORRECTIVE ACTIONS TAKEN | 180 |
| LOW PRESSURE PULSE READINGS | 190 |
| BLADE MISSING CONTROL WARNING | 200 |
| ENGINE SHUT-OFF SIGNAL | 210 |
| ROTOR BLADE | 220 |

METHOD AND APPARATUS FOR AN AERODYNAMIC STABILITY MANAGEMENT SYSTEM

BACKGROUND OF THE INVENTION

This invention relates generally to gas turbine engines, and more particularly, to methods and apparatus to facilitate stall avoidance of gas turbine engines using an aerodynamic stability management system.

Gas turbine engines have limited ranges of operation due to aerodynamic phenomena that occur in the compressor system such as rotating stall. Rotating stall manifests itself as a region of severely reduced flow that rotates at a fraction of the compressor rotational speed and causes a drop in performance. Gas turbine engines stall primarily due to sudden acceleration, pressure distortion and/or engine degradation. Sudden acceleration is caused by feeding an excessive amount of fuel to the gas turbine engine. Pressure distortion is caused when an operator takes corrective or evasive action and the gas turbine engine inlet experiences irregular air flow pressure. Currently, engine fuel scheduling is developed through many trials and error, including allowance for deterioration. Additionally, there is currently no means to intelligently govern engine maintenance and to sense for missing rotor blades.

Engine stall affects operational safety and damages engine equipment causing maintenance costs and engine degradation to increase. Consequently, there is a need for a system that can avoid gas turbine engine stall by monitoring operational parameters of the engine and adjusting available control devices in response to those operational parameters. Further, there is needed a system that uses these same operational parameters for reducing engine deterioration.

BRIEF DESCRIPTION OF THE INVENTION

In one exemplary embodiment, a method for using an aerodynamic stability management system is disclosed. The method includes placing at least one pressure sensor in a compressor, the at least one pressure sensor communicating with an aerodynamic stability management system controller and monitoring gas turbine engine performance using the aerodynamic stability management system controller. The controller includes a memory, an input/output interface and a processor. The method also includes defining a correlation threshold value and calculating a correlation measure using a plurality of pressure signals generated by the at least one pressure sensor and comparing the correlation measure with the correlation threshold value. When the correlation measure is less than the correlation threshold value a corrective action is implemented.

In another exemplary embodiment, an aerodynamic stability management system is disclosed. The system includes a plurality of variable stator vanes, a correlation threshold value, and an aerodynamic stability management system controller. The controller calculates a correlation measure using a plurality of pressure signals generated by at least one pressure sensor, and compares the correlation measure with the correlation threshold value. When the correlation measure is less than the correlation threshold value a corrective action is implemented.

In yet another exemplary embodiment, an aerodynamic stability management system controller is disclosed. The system includes a memory for storing data, an input/output interface configured to send and receive signals and a processor for calculating a correlation measure using a plurality of pressure signals generated by an at least one pressure sensor, a total number of corrective actions taken and a number of rotor blades. Calculating the correlation measure comprises comparing the correlation measure with a correlation threshold value, and when the correlation measure is less than the correlation threshold value a corrective action is implemented.

DETAILED DESCRIPTION OF THE INVENTION

Figure 1:
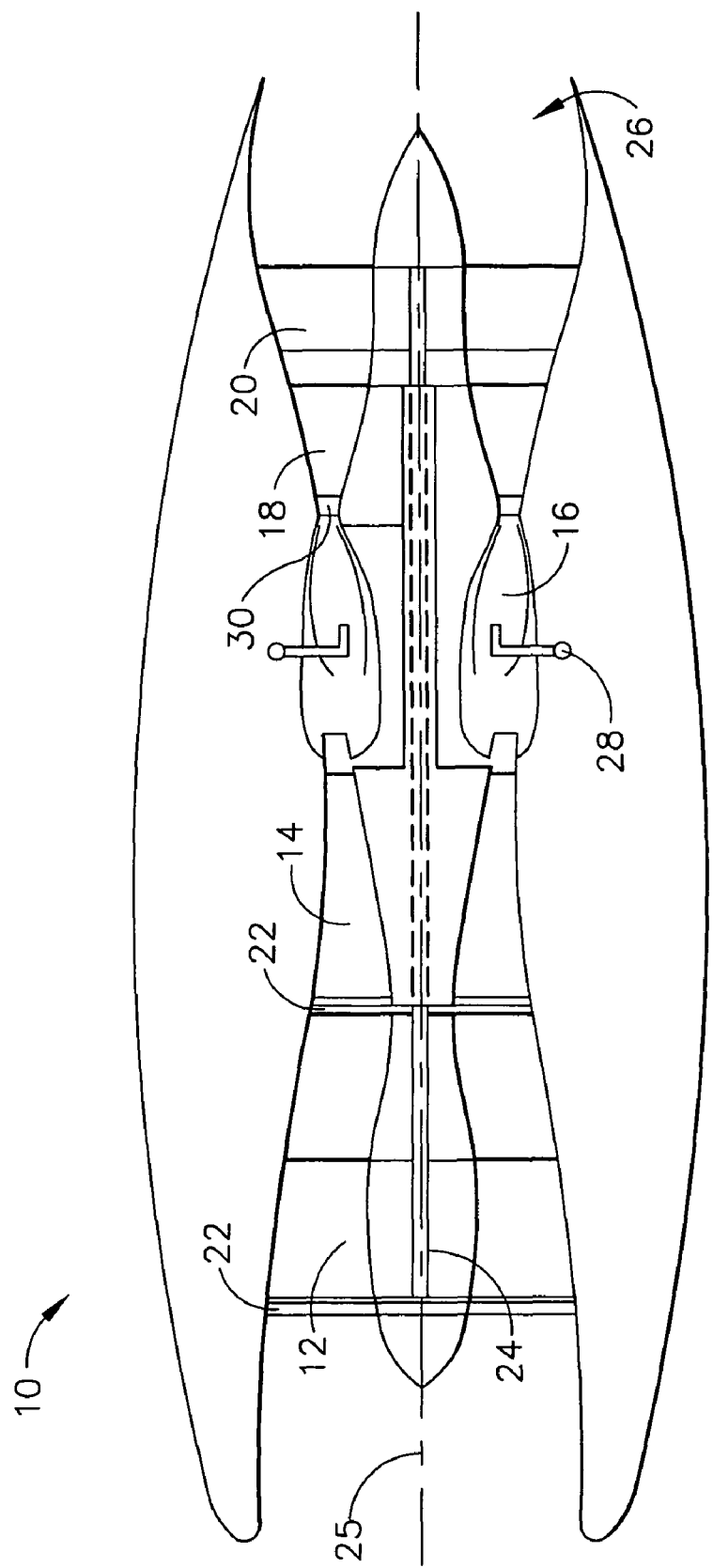
FIG. 1 is schematic diagram of a gas turbine engine.

FIG. 1 shows a schematic illustration of a gas turbine engine 10 including a low pressure compressor 12, a high pressure compressor 14 and a combustor 16. The gas turbine engine 10 also includes a high pressure turbine 18, a low pressure turbine 20 and a turbine nozzle assembly 30.

In operation, air flows through the low pressure compressor 12 and compressed air is supplied from low pressure compressor 12 to high pressure compressor 14. Each of the low pressure compressor 12 and the high pressure compressor 14 includes variable stator vanes 22 that control the incidence angle of the air as it enters the compressor 12, 14, allowing the gas turbine engine 10 to operate more efficiently. Variable stator vanes 22 effectively take the swirl out of the air and redirect the air to optimize engine 10 performance. A conventional fuel system 28 provides fuel that is combined with high pressure air and burned in the combustor 16. The resulting high temperature combustion gases are delivered from the combustor 16 to the turbine nozzle assembly 30. Airflow (not shown in FIG. 1) from the combustor 16 drives the high pressure turbine 18 and the low pressure turbine 20.

Figure 2:
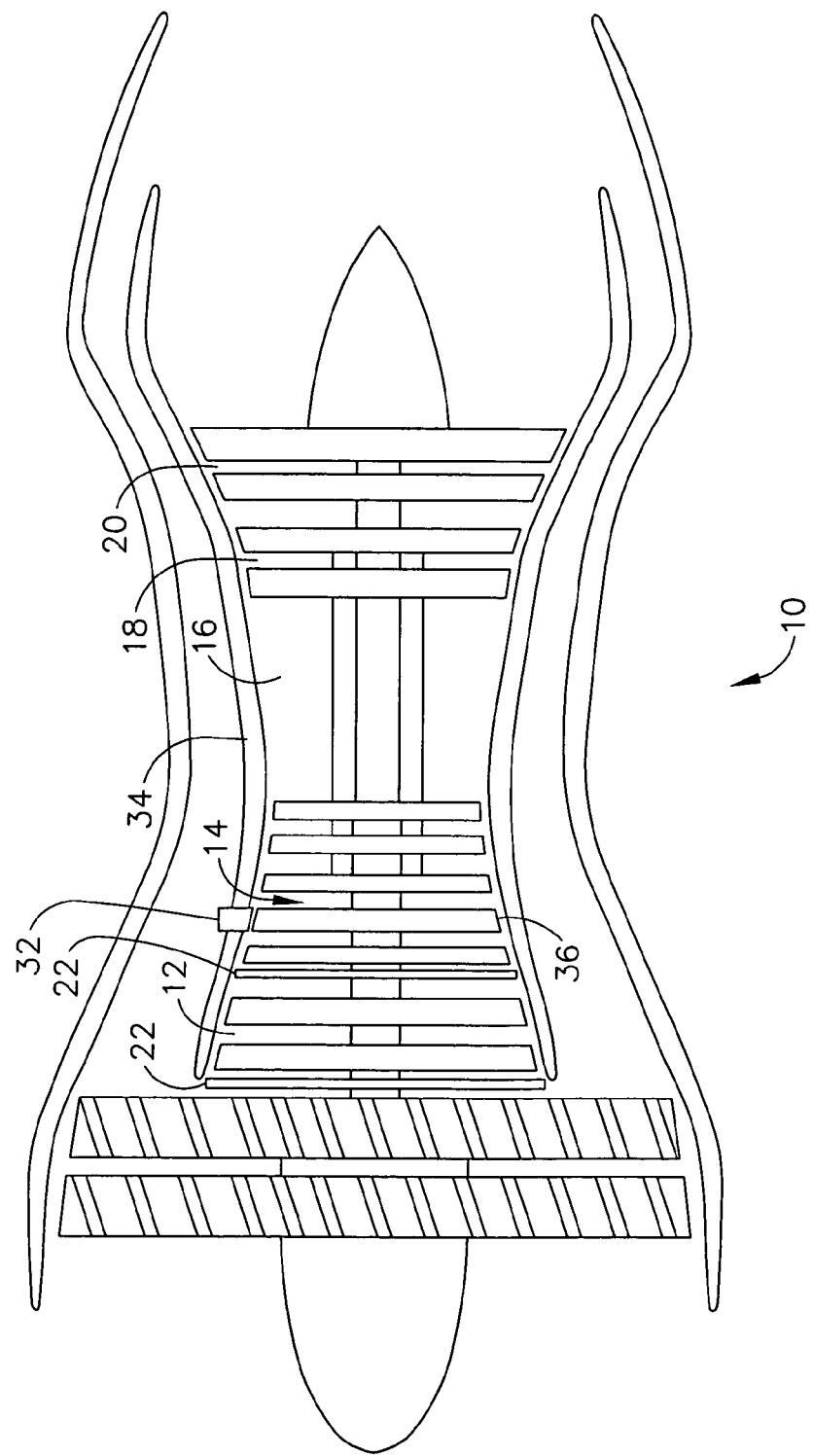
FIG. 2 is a schematic cross sectional view of a gas turbine engine.

FIG. 2 illustrates a cross sectional view of the gas turbine engine 10 of FIG. 1. In the exemplary embodiment, one or more high passed pressure sensors 32 are disposed on the inside surface of the high pressure compressor casing 34 over a selected stage of rotor blades 36. The pressure signals are high-passed to ensure that the measured pressure has zero mean. It should be appreciated that although the exemplary embodiment is described using pressure sensors 32 disposed on the high pressure compressor 14, in various other exemplary embodiments the pressure sensors 32 can also be used to measure pressure in the low pressure compressor 12, in both the low and high pressure compressors 12, 14, or in any compression component in the gas turbine engine 10. Further, it should be appreciated that the pressure sensors 32 may be installed in any area within the compressors 12, 14 including on the rotor blades 36 themselves and on other various surfaces within the compressors 12, 14. The pressure sensors 32 are a standard pressure sensor well-known in the art for use in gas turbine engines 10. Additionally, it should be appreciated that the pressure sensors 32 may be any type of sensor capable of measuring pressures within the harsh operating environment of a gas turbine engine 10. The pressure sensors 32 should be capable of taking pressure samples at a very high rate, such as for example 200 KHz per second. The pressure sensors 32 communicate with a controller 100 by sending an electrical signal corresponding to each pressure sample to the input/output circuit 110 of the controller 100 for the determination of a correlation measure.

Figures 3, 4:
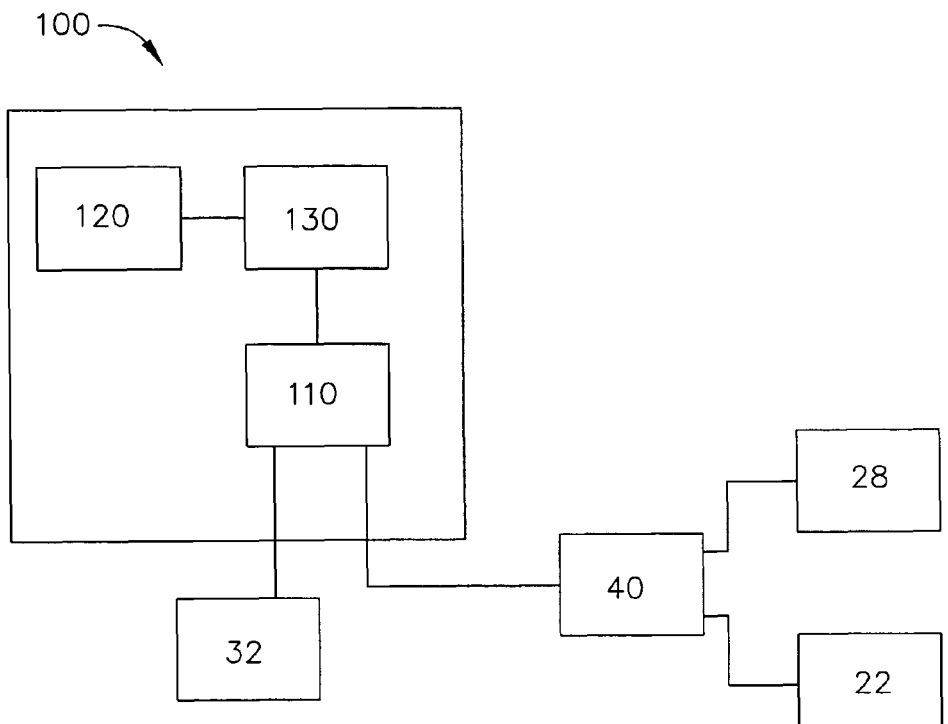
FIG. 3 is a diagram showing a controller for an exemplary embodiment of the invention.
FIG. 4 is a diagram showing the memory contents for an exemplary embodiment of the invention.

As shown in FIG. 3, the stability management system of the exemplary embodiment includes a controller 100 having an input/output circuit 110, a memory 120 and a processing circuit 130. The controller 100 communicates with the high passed pressure sensors 32 and with the engine control system 40. The engine control system 40 also communicates with the variable stator vanes 22, the fuel system 28 and the engine shut-off signal portion 210 of the memory 120.

It should be understood that each of the circuits shown in FIG. 3 can be implemented as portions of a suitably programmed general purpose computer. Alternatively, each of the circuits shown in FIG. 3 can be implemented as physically distinct hardware circuits within an ASIC (Application-Specific Integrated Circuit), or using a FPGA (Field-Programable Gate Array), a PLD (Programmable Logic Device), a PLA (Programmable Logic Array), or a PAL (Programmable Array Logic), or using discrete logic elements or discrete circuit elements.

The input/output interface circuit 110 receives signals sent to the controller 100 from sources such as the pressure sensors 32. In the exemplary embodiment, the controller 100 receives electrical signals from the pressure sensors 32 corresponding to each pressure sample. Additionally, the input/output interface circuit 110 outputs signals produced by the stability management system controller 100.

As shown in FIG. 4, the memory 120 can include one or more of a correlation threshold 140, first revolution high passed pressure readings 150, second revolution high passed pressure readings 160, the calculated correlation measure 170, corrective actions taken 180, number of low pressure pulse readings 190, blade missing control warning 200, engine shut-off signal 210 and rotor blade 220. The correlation threshold portion 140 stores a predetermined value for the correlation measure. The first revolution high passed pressure reading portion 150, stores a set of pressure sensor 32 readings for a first revolution of the shaft containing the compressor rotor blades 36. The second revolution high passed pressure reading portion 160, stores a set of pressure sensor 32 readings for a second revolution of the shaft containing the compressor rotor blades 36. The calculated correlation measure portion 170 stores the correlation measure calculated for the first and second revolutions of the shaft containing the compressor rotor blades 36. The corrective actions taken portion 180 stores the total number of corrective actions taken to avoid stalling the gas turbine engine 10. The low pressure pulse reading portion 190 stores the number of low pulse pressure readings received from the pressure sensors 32 per revolution of the shaft containing the compressor rotor blades 36. The blade missing control warning portion 200 stores a warning signal that may be issued when a rotor blade 36 is detected as missing. The engine shut-off portion 210 stores signals which are sent to the engine control system when a rotor blade 36 is detected as missing. The rotor blade portion 220 stores the number of rotor blades 36.

The memory 120 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disk and disk drive, a writeable or re-writeable optical disk and disk drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disk, such as a CD-ROM or DVD-ROM disk, and disk drive or the like.

In the exemplary embodiment, referring to FIG. 3, the processing circuit 130 performs many different calculations, including determining the correlation measure for two sequential revolutions of the high pressure compressor 14 rotor blade 36 shaft and verifies that the correlation measure is greater than or equal to the correlation threshold. The correlation threshold is a predetermined limit that the correlation measure cannot fall below; else corrective measures are implemented by actively regulating the fuel flow 28 rate to a fan or compressor stall margin or adjusting the variable stator vanes 22. In the exemplary embodiment, the correlation measure may be about 0.2. However, it should be appreciated that in other various exemplary embodiments the correlation measure may be any other suitable value required to practice the invention.

In the exemplary embodiment the controller 100 also stores the number of corrective actions taken to avoid stalling events in the corrective actions taken portion 180 of the memory 120. Storing the number of corrective actions taken facilitates monitoring the gas turbine engine's 10 deterioration and can be used as a guide for establishing maintenance intervals. Each avoided stall event degrades the engine, although not to the same degree as a full stall. In the exemplary embodiment, the processor 130 also counts the number of avoided stall events and stores them in the corrective actions taken portion 180. Counting the number of avoided stall events provides a quantitative measure that can be used for scheduling maintenance and engine water washes. Consequently, the exemplary embodiment provides a method for developing a maintenance schedule for addressing minor and easily performed engine maintenance issues before these issues evolve into more serious, difficult and costly issues.

The pressure sensors 32 generate pressure readings at and between each compressor rotor blade 36. As each rotor blade 36 passes the pressure sensors 32, the pressure pulses lower. Each rotor blade 36 corresponds to a lower pressure pulse. In the exemplary embodiment, the processor 130 also counts the number of lower pressure pulse readings for each revolution of the shaft containing the rotor blades 36 and stores the results in the low pressure pulse reading portion 190 of the memory 120. The processor 130 also compares the number of actual rotor blades 36, stored in the rotor blade portion 220 of memory 120, with the number of lower pressure pulse readings. In the exemplary embodiment the number of rotor blades 36 equals the number of lower pressure pulse readings. For example, a high pressure compressor 14 having seventy two rotor blades 36 should generate seventy two low pressure pulse readings per revolution, each reading corresponding to one rotor blade 36. If fewer than seventy two lower pressure pulse readings are taken, for example seventy one, in one revolution of the rotor blade 36 shaft, then one rotor blade 36 will be interpreted as missing. In the exemplary embodiment the controller 100 may issue a warning stored in the control warning portion of the controller 100 indicating a rotor blade 36 is missing.

Gas turbine engines 10 are used on multiple engine and single engine craft. Depending on the number of engines, the controller 100 may also send an engine shut-off signal stored in the engine shut-off portion 210 of the memory 120 to the engine control system 40, so that an engine may be shut off when a rotor blade 36 is detected as missing. In the exemplary embodiment, craft having multiple engines implement an engine shut-off by sending the signal stored in the engine signal shut-off portion 210 to the engine control system 40 to implement the engine shut-off. Craft having only a single engine do not implement an engine shut-off.

Figure 5:
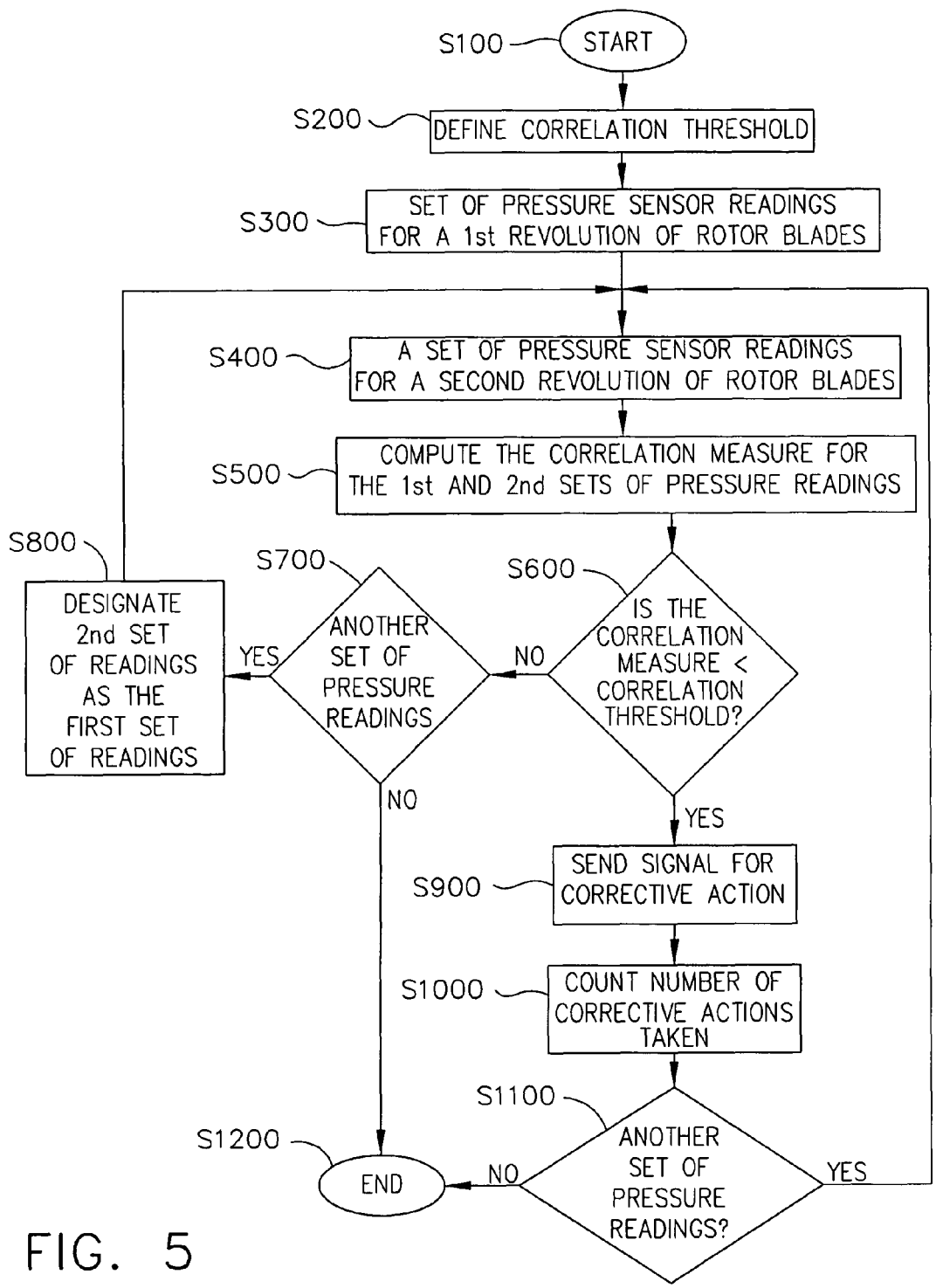
FIG. 5 shows an exemplary embodiment of a flowchart determination of a correlation measure according to an exemplary embodiment of the invention.

FIG. 5 is a flowchart outlining one exemplary embodiment of the stability management system for determining whether corrective action is necessary to avoid stalling the gas turbine engine 10. Beginning in step S100, operation continues to step S200 where a correlation threshold is defined. Then, in step S300, a pressure sensor 32 generates a set of pressure sensor readings during a fraction of a first revolution of the high pressure compressor 14 rotor blade shaft, called a sensing period SP. The sensing period SP is a fraction of the time required for the first revolution and is a predetermined time period that is less than or equal to that required for a complete revolution of the high pressure compressor 14 rotor blade shaft. The set of pressure readings is comprised of the number of readings taken by the sensor during the sensing period SP. In one exemplary embodiment, the pressure sensor 32 takes, or collects, about seventy two pressure readings during the sensing period SP which translates into about seventy two pressure readings per revolution of the rotor blade shaft. It should be appreciated that in other various exemplary embodiments, the number of pressure readings collected during the sensing period will be different for different sensing periods SP because the number of readings collected corresponds to the sensing period. It should also be appreciated that although the correlation measure calculations consider only collected pressure readings and do not consider all readings generated during a revolution, the sensors generate readings for the full duration of each revolution. For example, when using a pressure sensor 32 capable of generating pressure samples at a rate of 200,000 samples per second, generally between 70 and 100 pressure readings per revolution will be used in the correlation measure computation. In step S400, during a second revolution of the high pressure compressor 14 rotor blade shaft, the pressure sensors 32 generate a second set of pressure sensor readings for the same sensing period SP used for the first revolution. Operation then continues to step S500.

In step S500, the correlation measure for the first and second revolutions is calculated using a series of multiplications and integrations according to the following relationship:

$$C(n) = \frac{\sum_{i=n-wnd}^{n}(p_i \cdot p_{i\_shaft})}{\sqrt{\left(\sum_{i=n-wnd}^{n}p_i^2\right)\cdot\left(\sum_{i=n-wnd}^{n}p_{i\_shaft}^2\right)}}$$

In this relationship C(n) is the correlation measure, p is the high-passed pressure signal, i is an index, shaft is the number of samples in one shaft revolution, n is the current sample index and wnd is the correlation window in number of samples. In the exemplary embodiment, wnd spans two to four blades. It should be appreciated that in other various exemplary embodiments, wnd can be any value up to the number of samples in one shaft rotation. Next in step S600, the correlation measure is compared against the predetermined correlation threshold. Specifically, the correlation measure is compared against the correlation threshold to determine whether or not the correlation measure is less than the correlation threshold. When the correlation measure is not less than the correlation threshold, operation proceeds to step S700. Otherwise, operation proceeds to step S900. The following discussion describes operation proceeding to step S700, then describes operation proceeding to step S900.

When the correlation measure is not less than the correlation threshold, operation continues to step S700 where a decision is made regarding whether another set of pressure readings is desired. If so, then operation continues to step S800. Otherwise, operation continues to step S1200 where the operation ends. At step S800 the second set of pressure readings from step S400 is designated as the first set of pressure readings and then operation continues to step S400 to obtain another second set of pressure readings.

When the correlation measure at step S600 is less than the correlation threshold, operation continues to step S900. At step S900, an electrical signal is sent from the input/output circuit 110 of the stability management system controller 100 to the engine control system 40, which in turn takes corrective action to prevent the gas turbine engine 10 from stalling. In the exemplary embodiment, the engine control system 40 issues electrical signals corresponding to instructions for adjusting the fuel flow rate or for adjusting the variable stator vanes so that the gas turbine engine 10 does not stall. It should be appreciated that in other various exemplary embodiments, the engine control system 40 may issue instructions to other engine control devices, such as compressor active clearance control schemes, to prevent the gas turbine engine 10 from stalling. In this way, the correlation measuring scheme is also available to govern/regulate compressor active clearance schemes. Operation then continues to step S1000.

At step S1000 the corrective action is added to the cumulative count of corrective actions taken in the calculated correlation measure portion 170 of memory 120. Storing the number of corrective actions facilitates monitoring engine deterioration and scheduling engine maintenance. Next, operation proceeds to step S1100 where a decision is made regarding whether another set of pressure readings is desired. If so, operation continues to step S400. Otherwise, operation continues to step S1200 where the operation ends.

Figure 6:
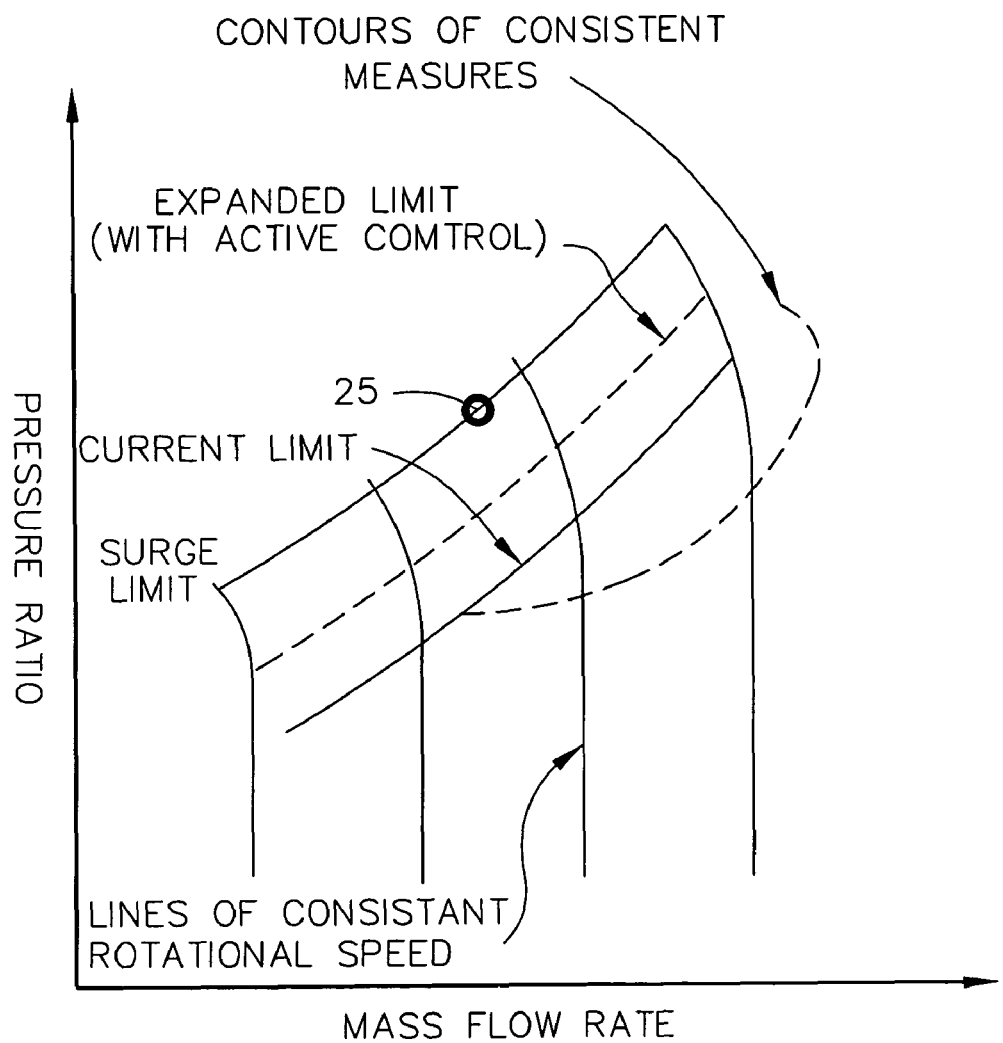
FIG. 6 is a compressor performance map illustrating the expansion in compressor operating limit including the surge limit where the gas turbine engine stalls.
Figure 7:
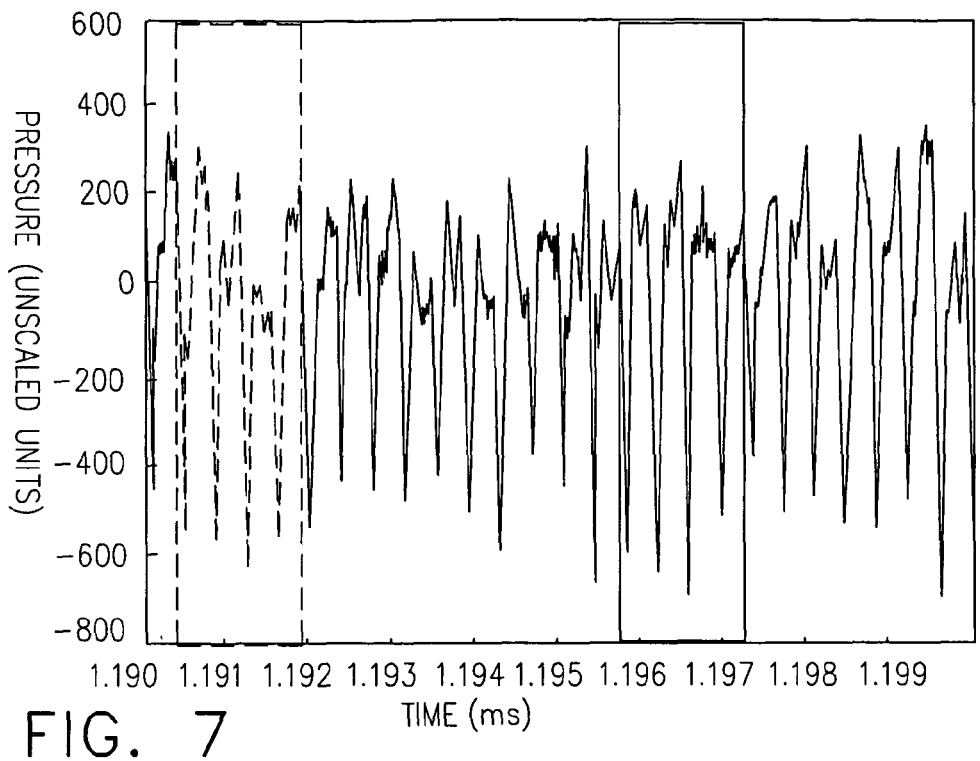
FIG. 7 is a graph showing a larger window and two smaller windows containing pressure readings taken over time for a compressor operating close to stall.

The exemplary embodiment as herein described is a robust real time fan/compressor aerodynamic stability management system using over-the-rotor-tip dynamic pressure sensors 32. A real time algorithm is used for computing a correlation measure through signal multiplication and integration. The correlation measure has a value of unity for a purely periodic signal while the correlation of a completely chaotic or random signal would be zero. The algorithm uses the existing speed signal from an engine control system 40 for cycle synchronization. The correlation measure is computed for individual pressure transducers, or sensors 32, over the rotor blade tips 36. The auto-correlation system samples a signal from a pressure sensor 32 at approximately 200 KHz (taken to be greater than ten times the rotor blade 36 passage frequency). A window of seventy two samples is used to calculate the auto-correlation showing a value of near unity along the compressor operating line and dropping towards zero when the compressor approaches the surge line 25 as shown in FIG. 6. FIG. 7 shows a window of pressure reading samples and includes two smaller windows, one using dashed lines and the other using solid lines. When the correlation measure drops below a pre-set threshold level and approaches the surge line 25, the stability management system sends an electrical signal to the engine control system 40, which in turn takes corrective action using the available control devices to move the engine 10 away from the surge line 25.

Figure 8:
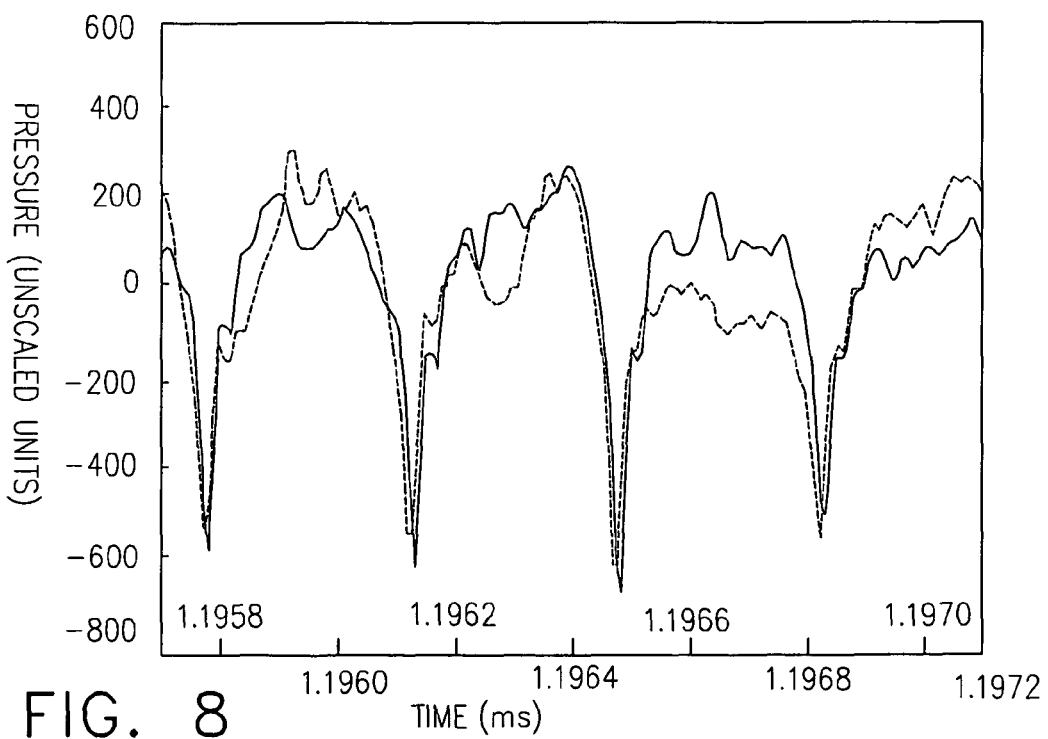
FIG. 8 is a graph superimposing the pressure readings contained in the two smaller windows of FIG. 7 to illustrate a reduction of periodicity when the compressor is operating close to stall.

The correlation measure detects the proximity of a compressor stability limit. The correlation measure is defined on the basis of the repeatability of the pressure time-trace, as observed by a pressure sensor 32 located over the high pressure compressor rotor blades 36. The pressure time-trace is mostly periodic when the high pressure compressor 14 is operating away from the surge line 25. However, as the boundary of stable operation is approached, occasional loss of periodicity in the pressure signal is observed, as shown in FIG. 8. FIG. 8 is a blown-up view of the dashed and solid waveforms contained in the smaller windows of FIG. 7, superimposed on each other. The loss of periodicity is evident when the waveform peaks are not regularly and closely matched. The loss of periodicity is quantified via the correlation measure, C(n), expressed as:

$$C(n) = \frac{\sum_{i=n-wnd}^{n}(p_i \cdot p_{i\_shaft})}{\sqrt{\left(\sum_{i=n-wnd}^{n} p_i^2\right) \cdot \left(\sum_{i=n-wnd}^{n} p_{i\_shaft}^2\right)}}$$

The correlation measure translates the unsteady characteristics of the flow field over the high pressure compressor rotor blade tips into a stability measure.

The exemplary embodiment provides a method and apparatus for monitoring certain gas turbine engine 10 operational parameters that reflect an engine's performance and indicate when a corrective action is necessary to avoid stalling the engine 10. The exemplary embodiment described herein promotes operator safety, prevents premature craft destruction and retards engine deterioration by facilitating maintenance schedule design, all of which translate into substantial cost savings, increased engine life and enhanced engine performance. The sensors and systems of the exemplary embodiment described herein are not limited to applications in gas turbine engines. It should be appreciated that the sensors and associated systems described herein may be applied to, or used in, any compression component in turbo-machinery, such as but not limited to, fans, low pressure compressors and high pressure compressors.

While the invention has been described with reference to a specific embodiment, the description of the specific embodiment is illustrative only and is not to be construed as limiting the scope of the invention. Various other modifications and changes may occur to those skilled in the art without departing from the spirit and scope of the invention.

What is claimed is:

1. A method for using an aerodynamic stability management system comprising:

placing at least one pressure sensor in a compressor, the at least one pressure sensor being in communication with an aerodynamic stability management system controller;

monitoring a gas turbine engine performance using the aerodynamic stability management system controller, the controller including a memory, an input/output interface and a processor;

defining a correlation threshold value and calculating a correlation measure using a plurality of pressure signals generated by the at least one pressure sensor, wherein calculating the correlation measure includes calculating the correlation measure according to a formula given by $$C(n) = \frac{\sum_{i=n-wnd}^{n}(p_i \cdot p_{i\_shaft})}{\sqrt{\left(\sum_{i=n-wnd}^{n} p_i^2\right) \cdot \left(\sum_{i=n-wnd}^{n} p_{i\_shaft}^2\right)}}$$

where C(n) is the correlation measure, p is a high-passed pressure signal, i is an index, shaft is a number of samples in one shaft revolution, n is a current sample index and wnd is a correlation window in number of samples; and comparing the correlation measure with the correlation threshold value, when the correlation measure is less than the correlation threshold value implementing a corrective action.

2. The method in accordance with claim 1 wherein placing the at least one pressure sensor in the compressor includes placing the at least one pressure sensor on an inside surface of the compressor over a stage of a plurality of rotor blades disposed on a rotor blade shaft.

3. The method in accordance with claim 1 wherein placing the at least one pressure sensor in the compressor includes placing the at least one pressure sensor on a rotor blade.

4. The method in accordance with claim 1 wherein implementing a corrective action includes sending an electrical signal to an engine control system and the engine control system implements the corrective action using a plurality of control devices.

5. The method in accordance with claim 4 wherein using the plurality of control devices includes adjusting a fuel flow, adjusting at least one of a plurality of variable stator vanes and using a compressor active clearance control scheme.

6. The method in accordance with claim 1, further comprising counting the total number of corrective actions.

7. The method in accordance with claim 6, further comprising using the total number of corrective actions for scheduling maintenance for the gas turbine engine.

8. The method in accordance with claim 1, further comprising counting a plurality of rotor blades, wherein each of the plurality of rotor blades corresponds to a lower pressure pulse reading.

9. The method in accordance with claim 1 wherein calculating the correlation measure further comprises computing the correlation measure between a first set of the plurality of pressure signals and a second set of the plurality of pressure signals, the first and second sets correspond to two sequential revolutions of a rotor blade shaft.

10. An aerodynamic stability management system comprising:

a plurality of variable stator vanes;

a correlation threshold value; and an aerodynamic stability management system controller, wherein the controller calculates a correlation measure using a plurality of pressure signals generated by an at least one pressure sensor, and compares the correlation measure with the correlation threshold value, such that when the correlation measure is less than the correlation threshold value a corrective action is implemented, wherein the correlation measure is calculated according to a formula given by $$C(n) = \frac{\sum_{i=n-wnd}^{n}(p_i \cdot p_{i\_shaft})}{\sqrt{\left(\sum_{i=n-wnd}^{n} p_i^2\right) \cdot \left(\sum_{i=n-wnd}^{n} p_{i\_shaft}^2\right)}}$$

where C(n) is the correlation measure, p is a high-passed pressure signal, i is an index, shaft is a number of samples in one shaft revolution, n is a current sample index and wnd is a correlation window in number of samples.

11. The system in accordance with claim 10 wherein at least one pressure sensor is disposed on an inside surface of the compressor over a stage of a plurality of rotor blades disposed on a rotor blade shaft.

12. The system in accordance with claim 10 wherein at least one pressure sensor is disposed on a rotor blade.

13. The system in accordance with claim 10 wherein an electrical signal is sent from the aerodynamic stability management system controller to an engine control system and the engine control system implements the corrective action using a plurality of control devices.

14. The system in accordance with claim 13 wherein using the plurality of control devices includes a fuel flow system, at least one of a plurality of variable stator vanes and a compressor active clearance control scheme.

15. The system in accordance with claim 10 wherein the aerodynamic stability management system controller is configured to count a total number of the corrective actions implemented.

16. The system in accordance with claim 15 wherein the total number of corrective actions implemented is used to schedule gas turbine engine maintenance.

17. The system in accordance with claim 10, further comprising a plurality of rotor blades, wherein each of the plurality of rotor blades corresponds to a lower pressure pulse reading.

18. The system in accordance with claim 10 wherein calculating the correlation measure further comprises computing the correlation measure between a first set of the plurality of pressure signals and a second set of the plurality of pressure signals, the first and second sets correspond to two sequential revolutions of a rotor blade shaft.

19. An aerodynamic stability management system controller comprising:

a memory for storing data;

an input/output interface configured to send and receive signals; and a processor programmed for calculating a correlation measure using a plurality of pressure signals generated by an at least one pressure sensor, a total number of corrective actions taken and a number of rotor blades, wherein calculating the correlation measure comprises comparing the correlation measure with a correlation threshold value, and when the correlation measure is less than the correlation threshold value, implementing a corrective action, wherein the correlation measure is calculated according to a formula given by $$C(n) = \frac{\sum_{i=n-wnd}^{n}(p_i \cdot p_{i\_shaft})}{\sqrt{\left(\sum_{i=n-wnd}^{n} p_i^2\right) \cdot \left(\sum_{i=n-wnd}^{n} p_{i\_shaft}^2\right)}}$$

where C(n) is the correlation measure, p is a high-passed pressure signal, i is an index, shaft is a number of samples in one shaft revolution, n is a current sample index and wnd is a correlation window in number of samples.

20. The controller in accordance with claim 19, wherein an electrical signal is sent from the input/output interface to an engine control system and the engine control system takes corrective action using a plurality of control devices to avoid engine stalling.

* * * * *